No. 759,785. PATENTED MAY 10, 1904.
H. E. WESTERVELT & W. G. HOLMES.
BAG MACHINE.
APPLICATION FILED OCT. 18, 1901.
NO MODEL. 8 SHEETS—SHEET 2.

Witnesses:

Inventors
Herbert E. Westervelt,
Walter G. Holmes,
By Charles A. Brown
Attorneys.

No. 759,785. PATENTED MAY 10, 1904.
H. E. WESTERVELT & W. G. HOLMES.
BAG MACHINE.
APPLICATION FILED OCT. 18, 1901.
NO MODEL. 8 SHEETS—SHEET 3.

Witnesses:
Max W. Zabel.
Harvey L. Hanson.

Inventors
Herbert E. Westervelt,
Walter G. Holmes,
By Charles A. Brown Gregg & Belfield
Attorneys.

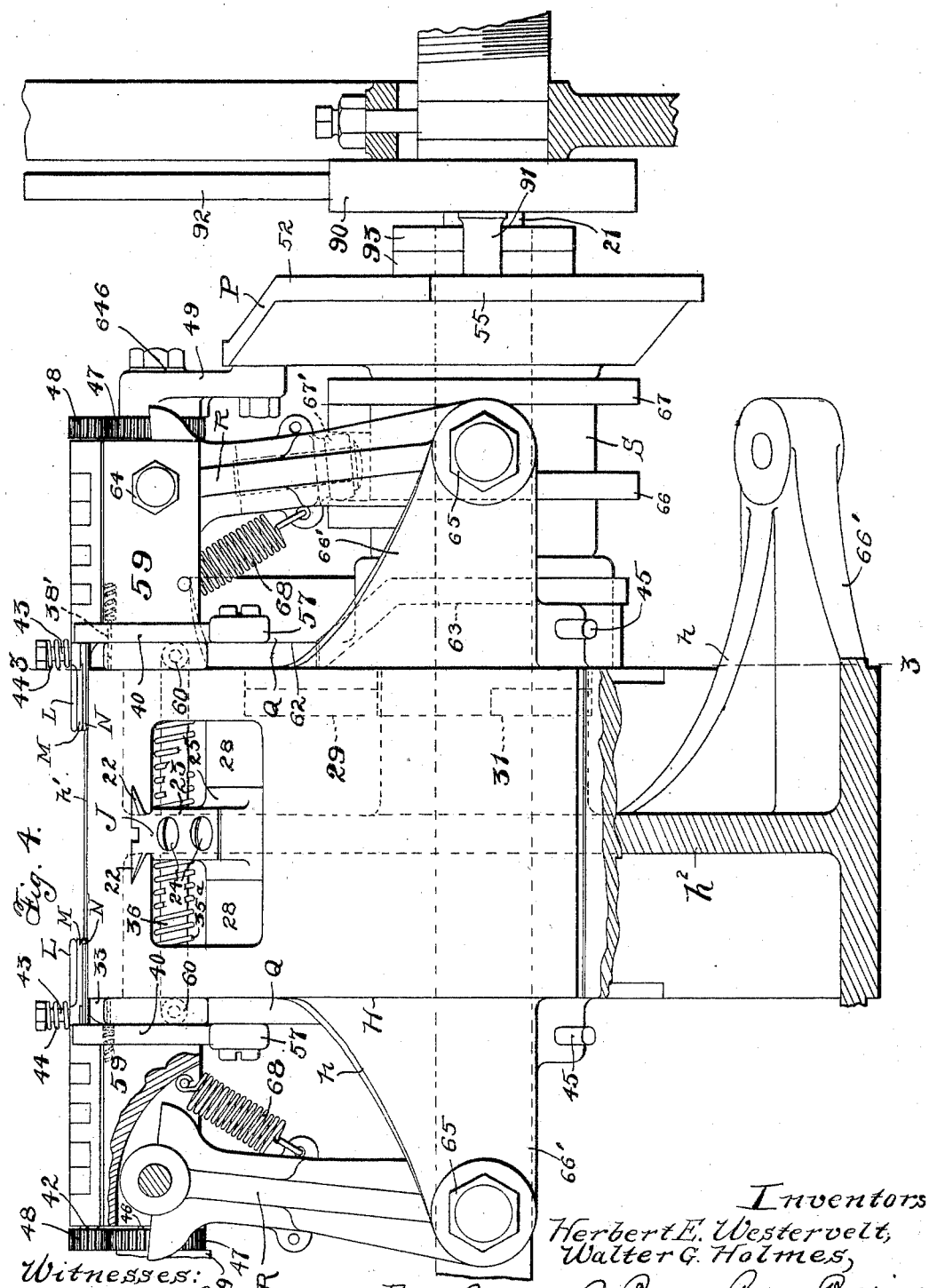

No. 759,785. PATENTED MAY 10, 1904.
H. E. WESTERVELT & W. G. HOLMES.
BAG MACHINE.
APPLICATION FILED OCT. 18, 1901.
NO MODEL. 8 SHEETS—SHEET 5.
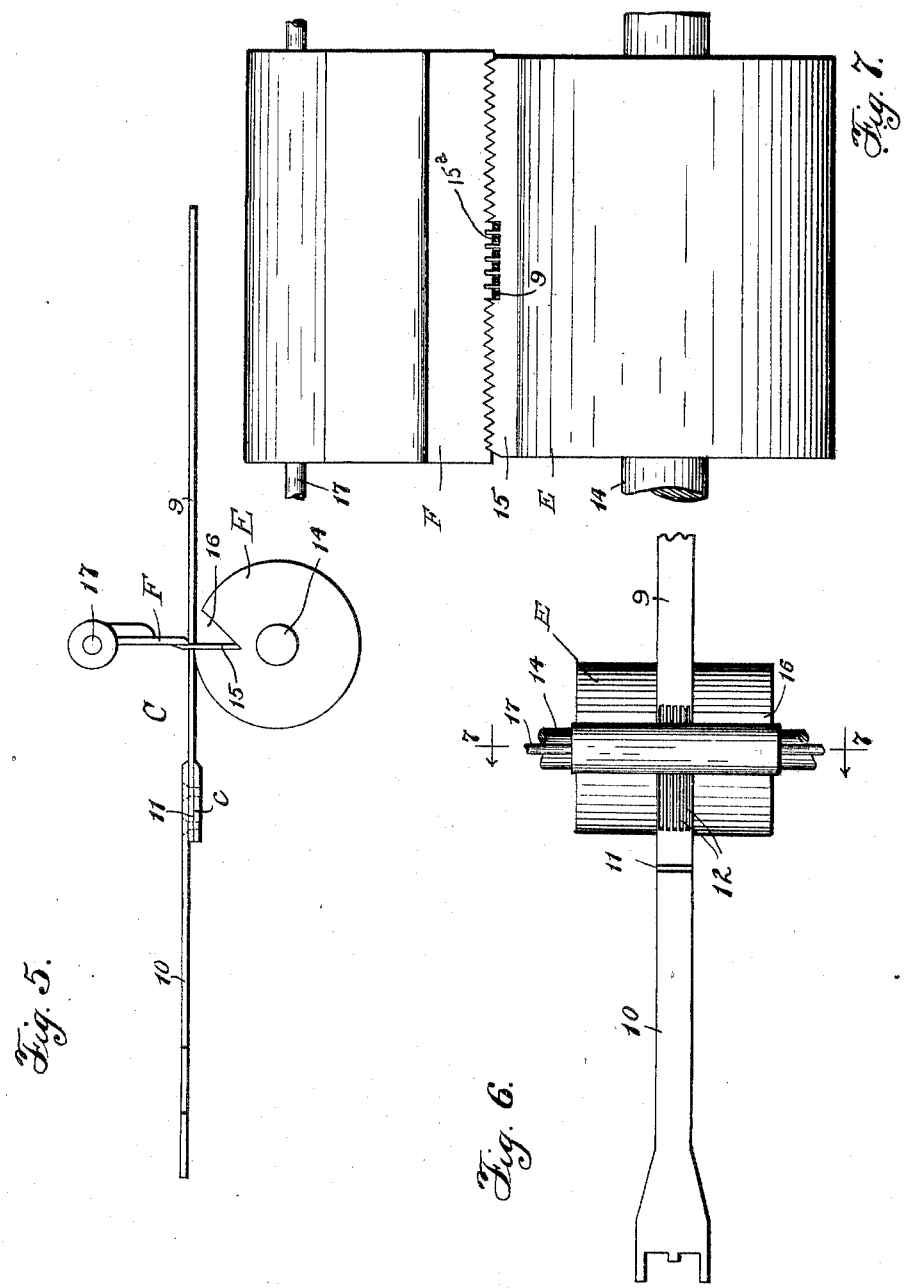
Witnesses:
Max W. Zabel.
Harvey L. Hanson.
Inventors:
Herbert E. Westervelt,
Walter G. Holmes,
By Charles A. Brown Cragg & Belfield
Attorneys.

No. 759,785. PATENTED MAY 10, 1904.
H. E. WESTERVELT & W. G. HOLMES.
BAG MACHINE.
APPLICATION FILED OCT. 18, 1901.
NO MODEL. 8 SHEETS—SHEET 6.
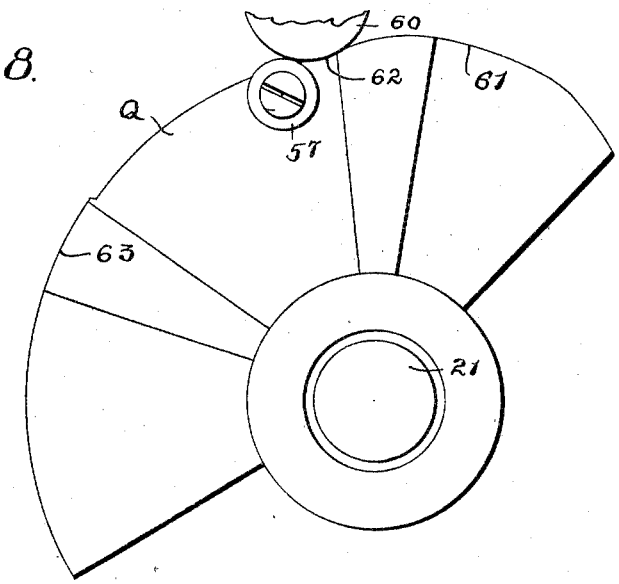
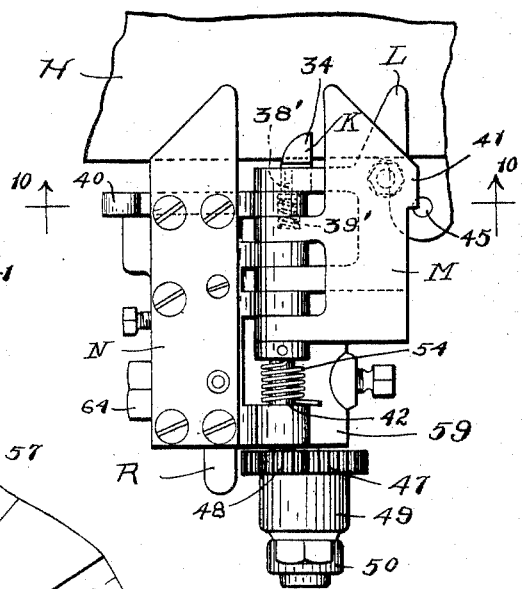
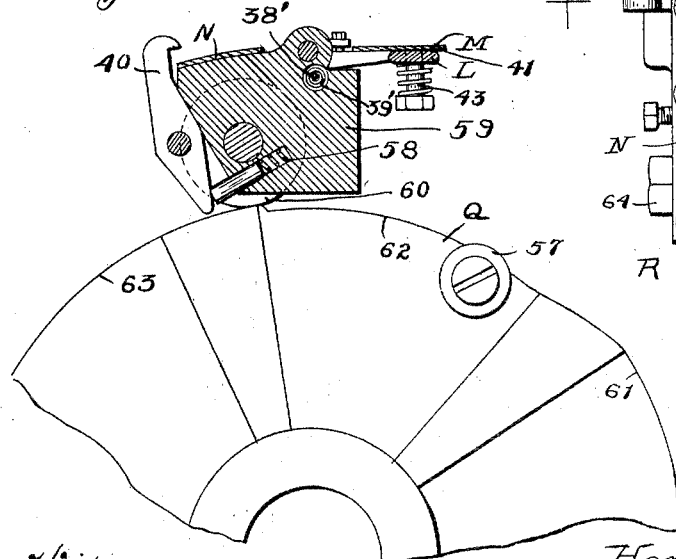
Witnesses:
May W. Label
Harvey L. Hanson
Inventors
Herbert E. Westervelt,
Walter G. Holmes,
By Charles A. Brown Cragg & Bielfeld
Attorneys.

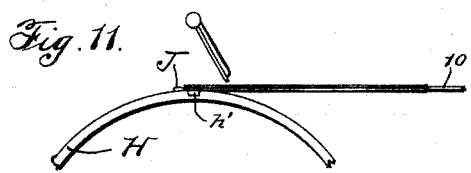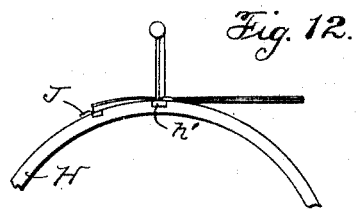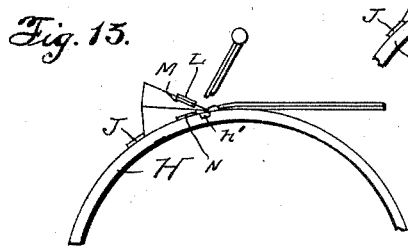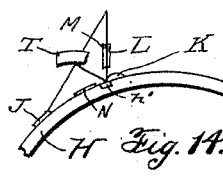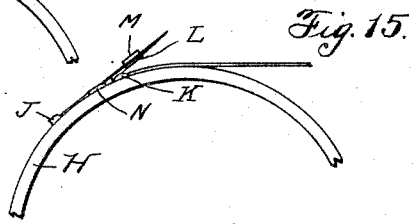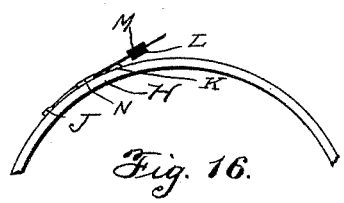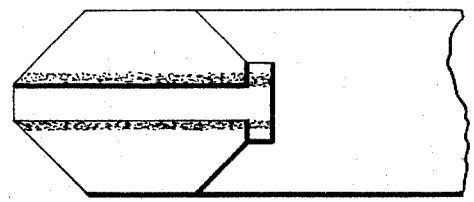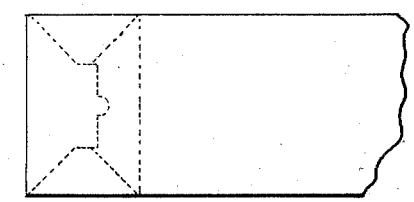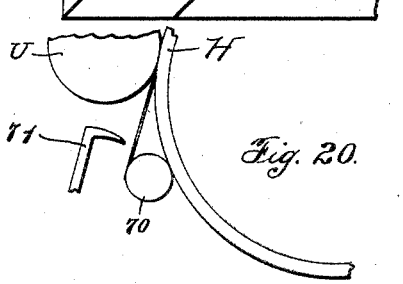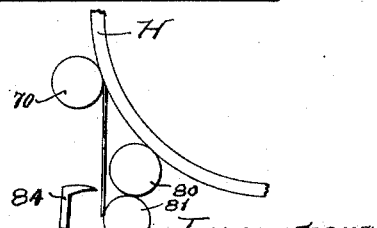

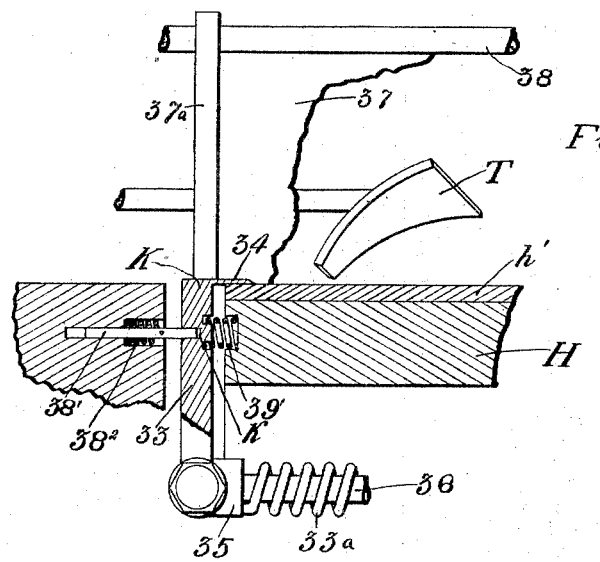
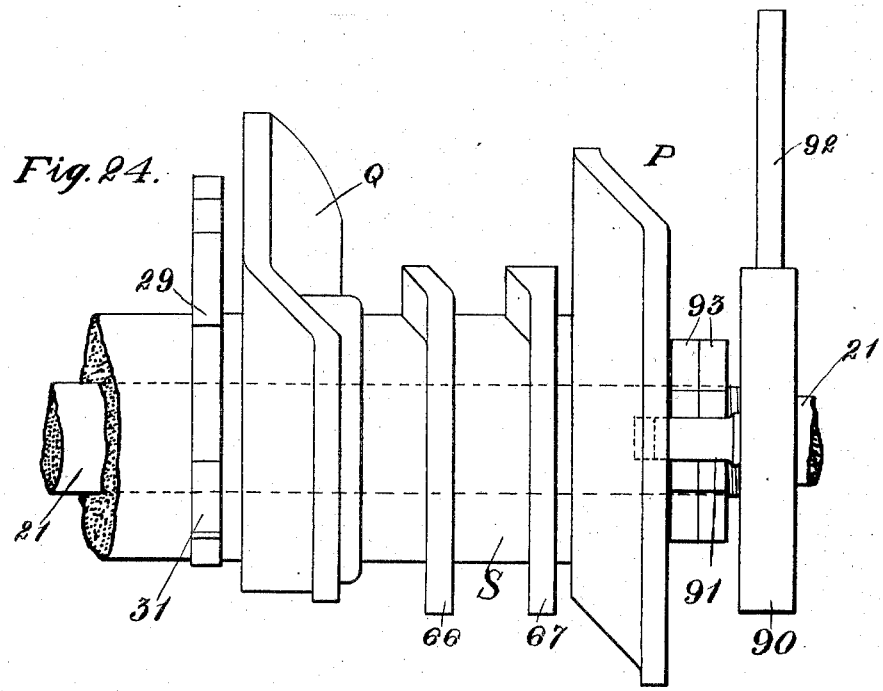

No. 759,785. Patented May 10, 1904.

UNITED STATES PATENT OFFICE.

HERBERT E. WESTERVELT, OF SOUTH BEND, INDIANA, AND WALTER G. HOLMES, OF BUCYRUS, OHIO; SAID HOLMES ASSIGNOR TO SAID WESTERVELT.

BAG-MACHINE.

SPECIFICATION forming part of Letters Patent No. 759,785, dated May 10, 1904.

Application filed October 18, 1901. Serial No. 79,080. (No model.)

*To all whom it may concern:*

Be it known that we, HERBERT E. WESTERVELT, residing at South Bend, in the county of St. Joseph and State of Indiana, and WALTER G. HOLMES, residing at Bucyrus, in the county of Crawford and State of Ohio, citizens of the United States, have invented a certain new and useful Improvement in Bag-Machines, (Case No. 1,) of which the following is a full, clear, concise, and exact description, reference being had to the accompanying drawings, forming a part of this specification.

Our invention relates to machines for making satchel-bottom bags out of tucked tubing.

Prominent objects of the invention are to provide new and improved mechanism for performing the various operations incident to the formation of the bag.

Figure 1:
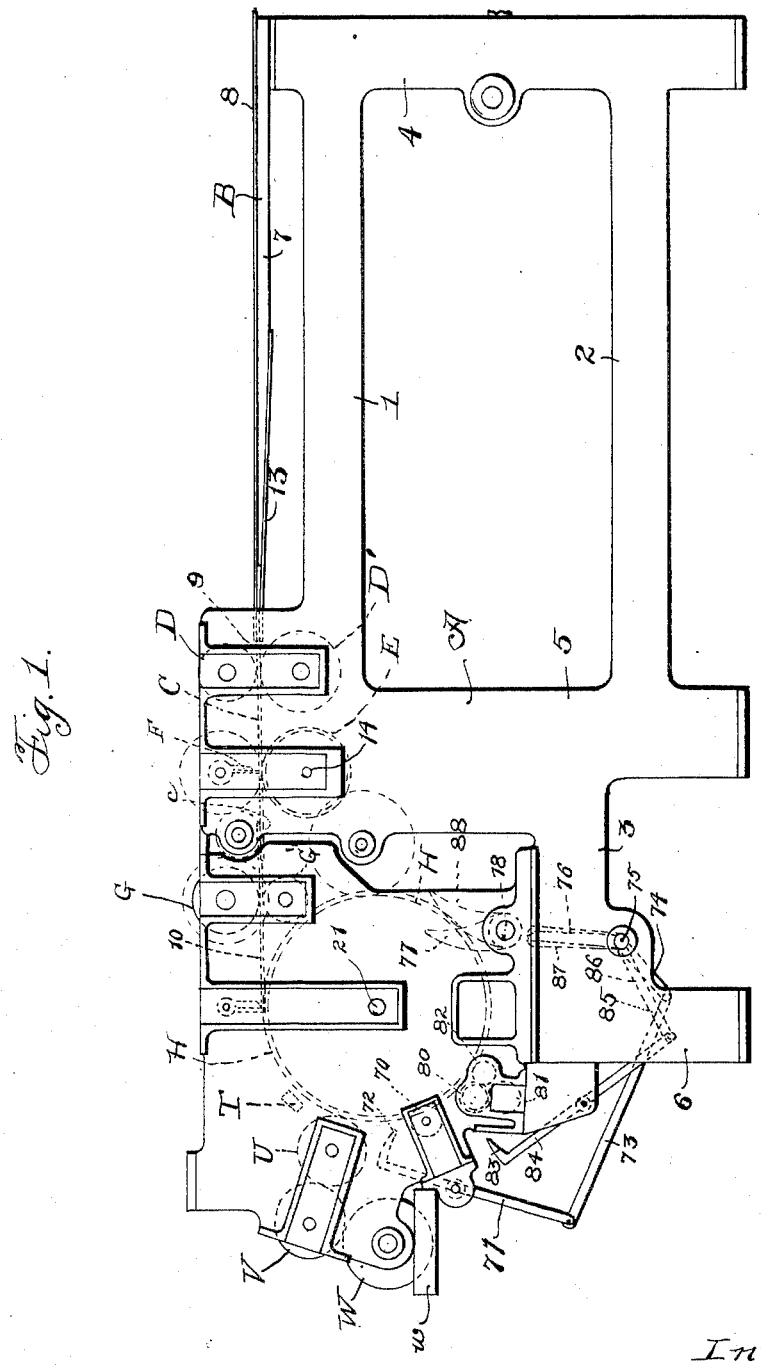
Figure 2:
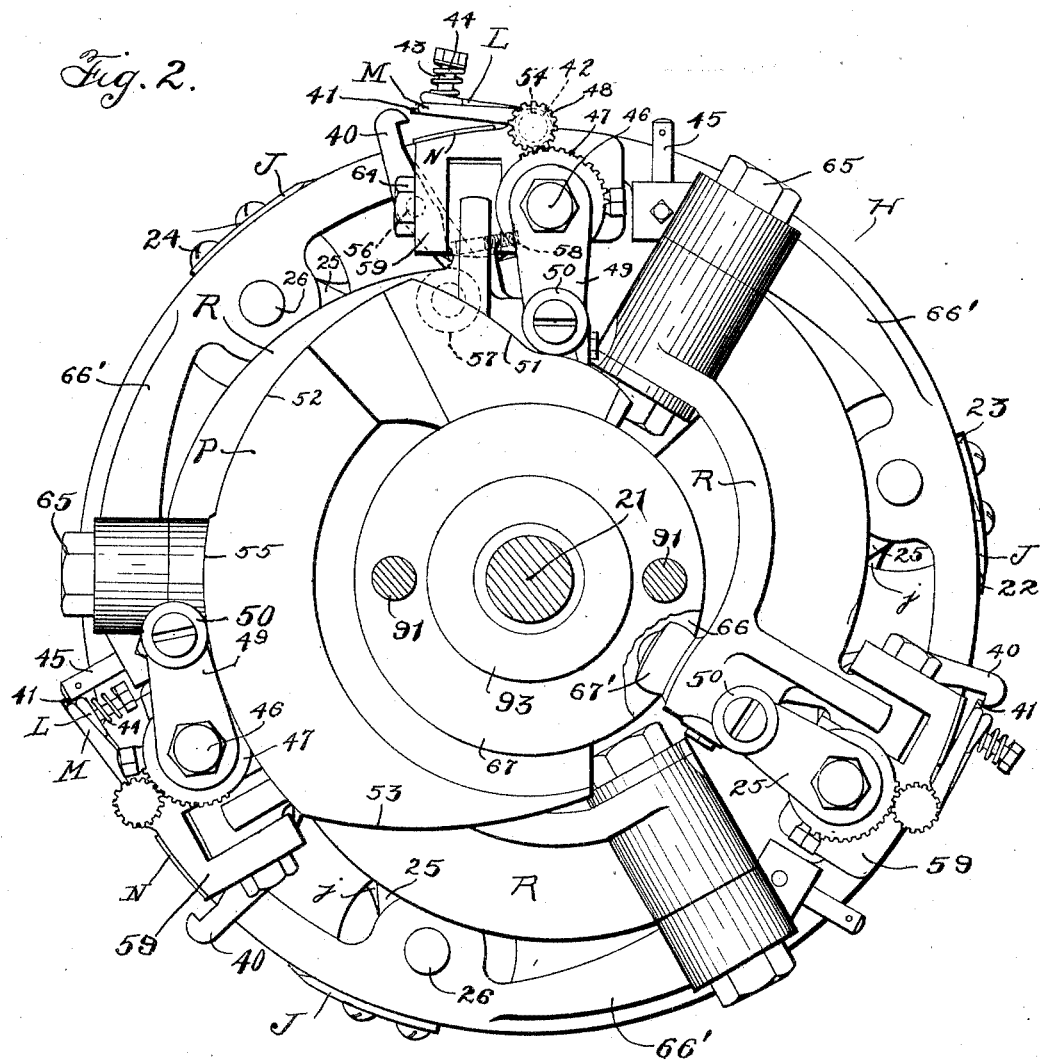
Figure 3:
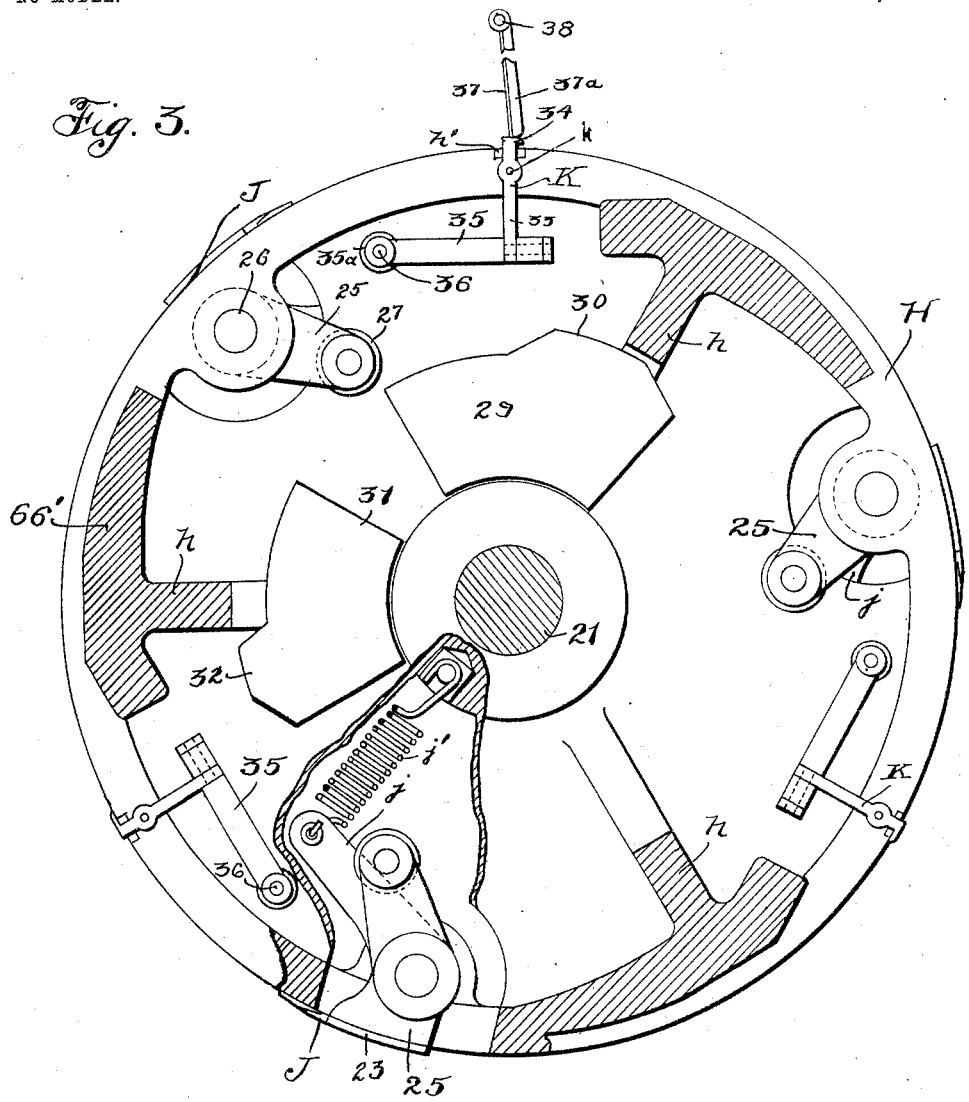

In the accompanying drawings, Figure 1 is a side elevation of a paper-bag machine embodying our present invention. Fig. 2 is a side elevation of a portion of such machine. Fig. 3 is a vertical section taken on line 3 3 in Fig. 4. Fig. 4 is an end view of the machine, certain parts being broken away for convenience of illustration. Figs. 5 and 6 are respectively a side elevation and a top plan of certain other mechanisms forming part of the machine. Fig. 7 is an end elevation of the parts shown in Fig. 6, on an enlarged scale, with the former shown in section on line 7 7 in said figure. Figs. 8 and 9 are views of details of construction. Fig. 10 is a cross-sectional view on line 10 10 of Fig. 9. Figs. 11 to 21, inclusive, are views showing the bag-blank in different stages of transformation to the satchel-bottom bag and the respective mechanisms acting upon it at such different stages. Fig. 22 is a detail view of the edge-turner. Fig. 23 is a view of the upper portion of the folding-bed and certain coöperating devices. Fig. 24 is a view of the folding-bed and coöperating cams.

Referring to Fig. 1, the machine shown for illustrating the invention is provided with a body-frame A, which is conveniently constructed with horizontal portions 1, 2, and 3 and vertical portions 4, 5, and 6, the lower ends of which latter portions form the legs of the machine.

The frame A, Fig. 1, is provided with a former B, which is arranged horizontally above the upper horizontal piece 1 and has its rear end secured to the top of the vertical portion 4. This former B can be of the ordinary construction. It is provided with a tongue C, Figs. 1, 5, 6, and 7, consisting of a flat metal strip conveniently formed of two portions 9 and 10, secured together at 11. The portion 9 is provided with a plurality of longitudinal slots 12 12. The section 10 has its forward end enlarged, as shown in Fig. 6, and this enlargement has its end bifurcated. The tongue could of course be made of a single strip; but the construction shown is preferable, because by it arrangement can readily be made for adjustment of the length of the tongue. The tongue C can be secured to the end of the former in any suitable or desired manner. The usual feed-rolls D D', driven in any usual manner, are also provided, being supported by the frame A. The roll D is above the tongue C and the roll D' below the same.

Cutting mechanism for cutting the tucked tube into proper lengths for bag-blanks is arranged in front of the feed-rolls D and D'. This cutting mechanism involves a roll E, mounted on the shaft 14 below the tongue C and provided with a cutting-blade 15, secured to the radial surface formed in the roll by a cut-away portion 16. The cutting-blade 15 is desirably provided with saw-teeth on opposite sides of the tongue C and with straight teeth 15$^a$, adapted to fit into the slots of said tongue, all as shown in Fig. 7.

Above the tongue C a coöperating blade F is located, being conveniently mounted for rotation upon a shaft 17. The shafts 14 and 17 are geared together, so that the cutting-blade 15 and the blade F approach the tongue simultaneously, as indicated by dotted lines in Fig. 1. The blades are so located that the cutting-blade 15 immediately precedes the coöperating blade F. The cutting is performed by this rotation of the two blades, the blade F striking the tongue C and forcing the tongue and the tube upon the same downwardly, so that the tube is cut by the teeth of the blade 15, it being understood, of course, that the tongue C, being a thin metallic strip, is so pliable as to be bent downwardly by the blade F. The saw-teeth on the cutting-blade 15 at the sides of the tongue sever the tucked tube thoroughly, and the straight teeth passing through the slots of the tongue shred or slit the tube. This shredded portion is readily broken or separated from the remainder of the tube when the blank is further pressed downward by the blade F.

The construction of the tongue C, especially so far as the slots 12 12 are concerned, can be changed or modified without departing from my invention.

A second set of feed-rolls G G' are arranged in front of the cutting mechanism just described, the roll G being above and the roll G' being below the tongue C. The roll E is on the main driving-shaft 14, which latter is suitably mounted in the frame A. The shaft 17, carrying the rotary blade F, is geared to the roll E. By the arrangement thus described the tucked tubing is fed continuously along the former B by the feed-rolls D and D'. It is also advanced by these rolls to the cutting mechanism, where the tubing is cut into bag-blanks by the cutting-blade 15 and the coöperating blade F. These cutting devices are of such diameter, of course, as to permit an amount of tucked tubing sufficient for a bag-blank to proceed between each cutting operation. The bag-blanks are fed forwardly one after another by the feed-rolls G G', it being seen that each blank is well into and firmly gripped by these feed-rolls before it is severed from the remaining portion of the tubing. The bag-blanks, properly cut, are thus delivered one after another from the end of the tongue C. It will be seen that in this way the lower ply of the bag-blank passes in below the tongue C and is therefore held down by such tongue.

The present machine is of that class or type of machines having a rotary carrier or cylinder, which receives the bag-blanks after they are properly cut and upon which these bag-blanks are folded and pasted to form the satchel-bottom. The remaining features of my present invention relate to improved mechanism for forming the diamond fold while the bag-blanks are being carried upon the rotary carrier or cylinder.

In Fig. 1 the rotary carrier or cylinder is represented at H and is shown mounted on a shaft 21, supported by the frame A, so that the top of its periphery comes immediately below the forked end of the tongue C. The particular construction and operation of this cylinder or carrier can be best understood by reference to Figs. 2, 3, and 4. It comprises a cylinder H, having a central web $h^2$ and having its cylindrical surface of suitable width to provide a folding-bed for the folding of the bag-blanks. It is desirably made of such diameter that its periphery can accommodate a plurality of bags. In the drawings it is shown arranged so as to receive and fold three bags during each revolution. The cylinder or carrier is therefore provided with three sets of mechanisms, each set of which is adapted to perform the operations necessary to fold a tucked tube into a satchel-bottom bag. As each set of mechanisms is alike, a description of one set will suffice for all. Each of these sets of folding mechanisms includes means for engaging the bag-blank as it is fed forwardly to the rotary folding-bed. The engaging device shown consists of a front gripper J, which as a matter of specific improvement is made with rearwardly-diverging inclined or beveled side edges 22 22, as shown in Fig. 4. It is also constructed with an end portion 23. This forward gripper J is located midway between the sides of the cylinder H and is extended lengthwise of the periphery thereof, as shown in Figs. 3 and 4. It is arranged and mounted for a swinging movement about its forward end toward and away from the folding-bed provided by the cylinder, so as to grip and release the bag-blank. The movement is such as to separate the rear end of the gripper from the folding-bed provided by the cylinder when the gripper is in position at the top of the cylinder to receive the front end of the bag-blank and to bring such front end downward against the folding-bed as the gripper recedes from such receiving position. This allows the front end of the bag-blank to pass between the folding-bed and the gripper when it is fed to the bed and causes the gripper to grip or clamp such front end of the bag immediately thereafter, and thereby compel the rotation of the blank with the cylinder. In Figs. 4 and 11 the gripper is shown depressed, so as to engage or grip the front end of the bag-blank. In so doing the front end of the gripper enters the recess or bifurcation at the forward end of the tongue C. Thus the tongue C and front gripper J coöperate with one another, the tongue serving to hold the forward end of the lower ply down upon the folding-bed, while the gripper approaches and grips such front end. By providing the front end of the tongue C with the indentation or recess above described (see Fig. 6) the gripper actually grips the end of the blank while it is still held down by the tongue.

By making the front gripper J with forwardly-converging side edges these edges act as defining edges to define the inclined forward edges or sides of the diamond fold. When the upper ply is bent or folded backwardly, the part of the blank forming the top of the diamond fold comes back over the front gripper, and the flaring sides thereof form or define these creases, which become the inclined forward edges or sides of the diamond fold. By reason of these flaring sides also the gripper covers the entire width of the front part of the lower ply upon which it rests, as a result of which the pulling of the blank occasioned by the bending or folding back of the upper ply cannot tear the lower ply, as would be the case if the edges of the front gripper were straight and so presented a straight cutting or tearing edge. While any mechanism could be employed for thus operating the gripper, the arrangement we have shown herein constitutes a matter of further and specific improvement. In this arrangement the gripper is secured, as by screws 24 24, to the outer end of the rocker-arm 25, Fig. 3, mounted upon a shaft 26, supported by the cylinder H, Fig. 3, the latter being provided with recesses in its periphery, through which the outer portion of the arm 25 passes. The lower end of the rocker-arm is provided with a roller 27, mounted on the shaft 26. On opposite sides of the rocker-arm 25 are collars 28 28. The shaft 26 is also provided with an arm $j$, and the end of this arm is connected to a spring $j''$, whose other end is connected to the hub of the cylinder. By this spring the shaft 26 is held in such position as to hold the gripper J always against the folding-bed, or, in other words, hold it closed.

A cam 29, having a raised portion 30, is arranged and mounted within the cylinder H so as to come opposite and afford a path for the roller 27 at the inner end of the rocker-arm 25. The raised portion 30 of this cam is located so as to cause the rocker-arm 25 to swing the gripper J upward, or, in other words, to open it when the gripper is in position to receive the bag-blank. Another cam, 31, having a raised portion 32, is also arranged within the cylinder H, so as to afford a path for the roller 27. The raised portion 32 is so arranged as to open the gripper after the diamond fold of the bag has been completed.

For the purpose of forming the crease in the blank for the primary fold any mechanism could of course be used. As a matter of further improvement, however, we employ a creasing-blade 37, which is arranged for rotation, as by mounting it upon a shaft 38, so as to swing down and have its lower edge strike against and crease the blank after the proper portion of the same has gone forward. This blade defines the crease throughout the entire width of the blank. To insure its proper action, the folding-bed at the point where it acts is made yielding or elastic, as by forming recesses in the bed and inserting therein strips $h'$, of rubber or like material. In order to grip the blank firmly to the folding-bed at this point, we employ side grippers K K, which are arranged opposite one another on the sides of the cylinder. These side grippers K K conveniently consist of side portions 33 and top portions 34, whereof the former lie alongside the sides of the cylinder and the latter are arranged above the same. The forward edges of these top portions 34 slant or incline rearwardly, as well shown in Fig. 9, whereby they permit the creasing-blade 37 to reach and act upon the full width of the bag-blank. These side grippers K K are arranged and mounted in such a way as to have their top portions 34 34 separated from the folding-bed when the grippers are at the receiving position of the cylinder and to have these portions close down against the folding-bed as the grippers recede from such position. The separation of the grippers from the folding-bed allows the bag-blank to pass in between them and the bed, and the subsequent closing of the grippers causes them to clamp it against the same. The top pair of grippers occupying the receiving position are shown in an open condition in Fig. 3. The other pairs in this figure and also those in Fig. 12 are shown in a closed condition, the folding-bed having advanced from its receiving position. As an arrangement for bringing about this movement of the grippers they are mounted upon arms 35 35, which latter are pivotally connected with the web of the cylinder at 36 36.

Assuming the grippers to approach the receiving position in an open condition, their top portions 34 34 are struck and pressed downwardly by a projection $37^a$ on the rotary blade 37. The mechanism by which these side grippers K K are moved in and out relatively to the sides of the cylinder H and are held in an inward position will be described hereinafter. When the grippers are freed after being swung inwardly against the cylinder and outwardly again by the mechanism to be hereinafter described, they are swung upwardly by a spring $35^a$, coiled about the pivotal shaft of the spindle 35. After the bag-blank has been gripped by the front gripper J and side grippers K K, as before described, the upper fold of the tucked tubing is engaged and swung backwardly about the side grippers, while at the same time the lower fold is also engaged and held down at a point between the front and side grippers. For this purpose we employ mechanism which constitutes a matter of further improvement, although, of course, any other mechanism could be employed. It comprises two pairs of upper tuck-turning devices and a pair of lower tuck engaging or gripping devices, whereof one of the pairs of upper tuck-turning devices and one of the lower tuck-gripping devices are arranged on each side of the cylinder opposite one another. These devices, it is understood, are advanced with the cylinder, so that they operate upon the bag-blank as the cylinder rotates. The devices shown for turning back the upper tuck comprise outside and inside pinching-fingers L and M, respectively, whereof the finger L is arranged to pass outside of the upper tuck and the finger M inside of the same and the two together to grip or pinch this tuck between them. The lower tuck gripping or engaging devices shown consist in each case of a gripper or finger N, which is adapted to enter between the upper and lower tucks and engage the lower one and clamp the same against the folding-bed.

The pinching-fingers L and M are understood to engage the upper tuck and swing the same about the crease-line formed by the creasing-blade 37 in an upwardly and then backwardly direction, so that the portion thereof lying in front of the crease-line comes into place above the portion of the blank immediately in the rear of that line. At the same time the lower tuck-grippers N N engage the lower tuck and hold the same fast upon the folding-bed. While the pinching-fingers L and M could have any desired form, they are preferably made of flat plates with pointed ends, as shown in Fig. 9. For securing this rotary movement of the pinching-fingers L and M they are mounted upon a rock-shaft 42, the finger L being fast on the shaft and the finger M being loose thereon. The finger M is provided with a stud 43, which extends through the finger L and which is surrounded by a coiled spring 44. This spring thus tends to force and hold the two fingers together at all times during their rotation on the shaft 42. When the fingers approach the receiving position of the folding-bed, the shaft 42 is in such position that the fingers are in advance of the shaft and substantially parallel with the folding-bed, or, in other words, in their downward and forward position. At such time a projection 41 on the finger M will engage with a catch 40. As the parts move forward the shaft is rotated so as to swing the fingers L and M upwardly; but the loose finger M, being held by the catch 40, is momentarily detained, permitting the shaft to swing the finger L up alone. This causes a separation of the fingers, which permits the introduction of the upper tuck between them. The continued forward movement of the folding-bed, however, results in the tripping of the catch 40, and the consequent release of the finger M, whereupon the latter springs upwardly and pinches the upper tuck between itself and the upper finger L. The continued forward movement of the folding-bed results in the continued upward rotation or swing of the fingers holding the tuck between them, which rotation is continued until these fingers occupy a position in the rear of the shaft 42 and close to the folding-bed, or, in other words, a position substantially one hundred and eighty degrees from their initial position. The upper tuck having been engaged by them through-out this movement is of course carried or swung completely back and is folded down about the primary crease, so as to form the diamond fold. In order to release the upper tuck from these fingers, an abutment 45 is provided, located in such position that the projection 41 on the finger M will strike against the abutment when the rearward swing of the fingers has been substantially completed. This of course stops the movement of the finger M, while at the same time the finger L, fast on the shaft 42, continues its swing momentarily. The result is a separation of the two fingers and the consequent freeing of the upper tuck. The fingers L and M are, at the beginning of the opening operation, shown in Fig. 13 and at the top of Fig. 2. In Fig. 14 they are shown nearly open, and in Fig. 15 and the lower left-hand side of Fig. 2 they are shown completely open. In Fig. 16 the opening of the fingers to release the upper tuck is shown. At the lower right-hand side of Fig. 2 the fingers are shown completely closed. The rotation of the shaft 42 for the purpose of effecting the swinging movement of the fingers is brought about by suitable mechanism for that purpose. While any such mechanism could be employed, as a matter of further improvement we employ that herein shown. In this mechanism there is provided a rock-shaft 46, carried by the cylinder H and having a gear-wheel 47 gearing with a pinion 48 on the shaft 42. The rock-shaft 46 is also provided with a rocker-arm 49, having its lower or inner end equipped with a roll 50. This roll 50 is adapted to travel upon a cam P, arranged outside of the cylinder H on shaft 21 and constructed with an outwardly-extending inclined surface 51 and an enlarged periphery 52, the former of which serves to retard the roll 50, and thereby swing the rocker-arm 49 upwardly and rearwardly to effect the upward and backward swing of the fingers L and M, and the latter of which serves to hold the roll 50 in such outward position, and thereby retain the fingers in their rear position. The cam P also has an inwardly-extending inclined surface 53, which permits the roll 50 to move inwardly and the rocker-arm 49 to thereby move so as to swing the fingers L and M back to their original position. To secure this restoration to original position, the shaft 42 is provided with a coiled spring 54, adapted to rotate the shaft 42 in a reverse direction. The supplemental swing of the rock-shaft 42 to move the finger L downwardly and separate it from the loose finger M while the latter is held by the stop 45 is secured by a projection or ridge 55, extending out from the surface 52. The catch 40 is pivoted at 56 and is tripped by a stationarily-mounted roll 57, located so as to engage the lower end of the catch. The catch 40 is held normally in position to engage the finger M by a spring 58 acting upon the lower end of the catch. The lower tuck-gripper N is elevated slightly above the folding-bed as the latter approaches the receiving position, so as to permit the lower tuck to pass between it and the bed. As the bed recedes from the receiving position, however, this gripper descends and grips the lower tuck between it and the bed. We arrange for this operation by securing the gripper to a rocking block 59, Figs. 2, 4, and 10, which is arranged to tilt or swing about its outer end, so as to lift or depress the gripper. The tilting movement of this rocking block 59 is secured by providing its inner end with a roll 60 and arranging a cam Q, Fig. 8, upon the frame of the machine, so that the roll 60 can travel upon it. This cam Q has an enlarged portion 61, which tilts the block 59 upwardly as it approaches the receiving position of the folding-bed, and also has a depressed portion 62, which allows the block to descend immediately after that position is passed. This cam Q has also a second elevated portion 63, which lifts the rocking block after the diamond fold has been formed, and thereby permits the extraction of the gripper from the bag-blank. The rocking block 59 is subject to a spring 68, tending to hold the block in an inward position. As a convenient arrangement the shaft 42, carrying the fingers L and M, and the rock-shaft 46 are mounted in this rocking block 59.

In order to permit the proper action of the fingers L, M, and N, they are moved in and out toward and away from the folding-bed, so as to enter and withdraw from the tucks of the bag-blank at the proper times. Their approach toward the folding-bed begins as the latter approaches the receiving position, and at this position they are at their inmost location. They continue in this way during the further movement of the bed until the fingers L and M have swung the upper tuck backwardly to its full extent and have become disengaged therefrom, whereupon they are moved outwardly, so as to remove them completely from engagement with the bag-blank. While of course any mechanism could be employed for this purpose, we secure the result by mechanism herein shown. In this mechanism the rocking block 59 is pivotally connected, as by a bolt 64, to the rear end of an arm R, which extends forwardly from the rocking block and is made in the form of a circular arc. Its forward end is pivoted, as by a bolt 65, to a rigid projection or arm 66', extending from and forming a part of the cylinder H. The pivotal connection of the rocking block with the arm permits, it will be seen, the proper tilting or rocking of the block 59 to secure the revolution and depression of the stationary finger N, while the pivotal connection of the arm R with the rotary cylinder permits the arm to be swung, so as to secure an in-and-out movement toward and away from the folding-bed of the end of the arm carrying the rocking block. The arm R swings directly toward and away from the cylinder. Its pivotal axis is a radius of the cylinder. The swinging movement of the arm R is secured by a closed cam S, consisting of two cam-plates 66 and 67, arranged side by side, with which plates a roller 67' is adapted to engage. These cam-plates 66 and 67 are bent inwardly at their upper portions, and thence downwardly to the left of such portions, so as to give the arm R the proper swinging movement. Since the fingers thus move in and out by a swinging motion of the arm R, the cams P and Q referred to are laterally bent, so as to insure the coöperating elements traveling upon them. At a time when the upper tuck of the blank is swung back to an extent to cause the sides of the diamond fold to stand in substantially a vertical position the edge of these sides are struck by a stationary edge-turner T, by which they are bent slightly inward. This insures their becoming folded without tearing as the backward movement of the movable fingers continues. This stationary edge-turner T is conveniently made in a form somewhat similar to a plowshare, with its front end innermost and its sides sloping outwardly as they extend backwardly and downwardly. Thus as the edge of the bag-blank strikes against the outermost portion of this edge-turner and then advances along the inwardly-inclined portions thereof it is bent or pushed slightly in an inwardly and downwardly direction. This edge-turner T is conveniently mounted upon the body-frame A of the machine.

The means by which the side grippers K K are swung in and out relatively to the folding-bed was omitted from the description of these grippers and will be referred to now. The grippers are moved inwardly by the ends of the rocking blocks 59 59. As these blocks approach the rotary cylinder when the latter comes near the receiving position the ends of the blocks strike against and move the grippers K K inwardly toward and against the cylinder. The grippers are held in an inward and downward position by pins 38' 38', carried by the rocking blocks 59 59 and subjected to springs tending to push them outwardly from the ends of the blocks toward the rotary cylinder. For this purpose the grippers K K are provided with apertures $k$ $k$, Fig. 3, so that when these apertures register with the pins 38' 38' the latter are projected forwardly, so as to enter the apertures, and thereby engage and lock the grippers in a downward position. The grippers are swung outwardly away from the rotary cylinder by springs 39' 39', carried by the grippers and interposed between the same and the sides of the rotary cylinder H. These springs are allowed of course to act after the grippers have been released by the withdrawal of the rocking blocks 59 59. The mechanism thus described performs the operation of swinging the upper tuck of the bag-blank back about the primary crease, so as to form the diamond fold. In this condition the bag-blank appears as shown in Fig. 17. As soon as the diamond fold is completed the front gripper J is swung upwardly and forwardly by its rocker-arm 25 striking the elevated portion 32 of the cam 31, Fig. 3. When it is thus thrown upwardly, it tears its way through the front ends of the portions of the blank forming the sides of the diamond fold, and thus frees itself from the blank. After this has been done the fingers are moved outwardly and free themselves from the blank. Before the fingers have entirely left the blank, however, the prow portion of the diamond fold passes under a paste-roll U, which serves to apply paste to the inner edges of the side flaps of the fold and also to iron the fold down or complete the creases therein. This paste-roll U is of the usual construction and is mounted in any suitable way upon the frame A. It coöperates with a supply paste-roll V, which in turn derives its supply from the roll W, which dips into a reservoir w. These devices are of the usual construction. As the prow portion of the diamond fold emerges it is engaged by a tucking mechanism, by which the first transverse fold is made, as shown in Fig. 18, and after this it is engaged by a second tucking mechanism, by which the second transverse fold or, as it is called, the "blind" fold is made. While these tucking mechanisms could be of any suitable construction, they are, as a matter of further and specific improvement, constructed as herein shown.

The first tucking mechanism comprises a tucking-roll 70 and a long arm 71, carrying a tucking-blade 72. The tucking-roll 70 is arranged close to the cylinder H, but in such position that the prow portion of the flap as it emerges from between the paste-roll U and the cylinder will pass outside of the roll 70—that is, it will not pass between that roll and the cylinder. When it is passing in this way, the arm 71 is swung so that the blade 72 strikes the blank and pushes it at the proper point to form the first transverse crease between the roll 70 and the cylinder. Thus the prow portion of the diamond fold is bent or folded backwardly against the body of the diamond and the first transverse crease is formed. The tucking-roll 70 is conveniently mounted in suitable bearings in the frame A. The arm 71 is properly swung to form this first transverse crease by a link 73, and this link 73 is in turn actuated by a rocker-arm 74 on a rock-shaft 75. This shaft 75 also carries a second rocker-arm 76, and this arm is actuated by a cam-arm 77 on a rotary shaft 78. The shaft 78, it will be understood, is properly geared with the cylinder H, so that the cam-arm 78 strikes the rocker-arm 76 so as to swing the arm 71 at the proper time.

The second tucking mechanism, that is for forming the blind fold, comprises tucking-rolls 80 and 81, which are arranged in front of the tucking-roll 70. These rolls 80 and 81 are in such position that as the bag-blank comes from the tucking-roll 70 and passes in a direction substantially tangent with the cylinder H, as it naturally tends to do, it will pass outside of or to the left of these rolls 80 and 81, as shown in Fig. 21. The roll 80 is driven by the cylinder H through the medium of a gear 82 and the roll 81 is geared to the roll 80. A tucking-blade 83 is carried by a swinging arm 84, and the latter is pivotally connected with a link 85. The latter is in turn connected with a rocker-arm 86 on the shaft 75, and the latter is provided with a second rocker-arm 87. The arm 87 is actuated by a rotary cam 88, mounted on the shaft 78. By such arrangement when the bag-blank passes in the rear of the tucking-rolls 80 and 81 the tucking-blade 83 is actuated so as to tuck the blank at the proper point for the blind or second fold in between the two rolls 80 and 81, whereupon the latter effect the folding of the blind or second fold. The bag as so folded is shown in Fig. 19, it being understood that in this figure the bag is shown with the bottom folded in, as is its condition after this last fold is formed. The blank as thus folded emerges from the machine as a completed satchel-bottom bag.

As a matter of further and specific structural improvement the various cams, as 29, P, Q, and S, are mounted upon the shaft 21 of the cylinder H, so as to be free to move independently of the shaft. Arrangement is made for swinging the cams bodily a small extent about the shaft by providing a collar 90 upon the shaft and providing this collar with rods or arms 91 91, which extend to and engage the cam P. The collar 90 is provided with a lever 92, by which it can be moved. By rotating this collar 90 the cams are adjusted about the shaft 21, and the various movements are made to occur sooner or later, as desired. The arms or rods 91 91 are fitted loosely in the cam P, so as to permit the cam to slide lengthwise on the shaft relatively to said arms. Thus the various cams can be adjusted along the shaft as well as about the same. Locknuts 93 93 are provided to hold the cams in such lateral adjustment.

Briefly reconsidered, the operation of the machine is as follows: The tucked tubing is fed along the former B and thence along the tongue C, on which latter it is properly cut into proper lengths for the bag-blanks. Each length is fed out to the end of the tongue C, overhanging the rotary cylinder H. As each bag-blank approaches the top of the cylinder one of the grippers J also approaches the same in an open condition, the gripper being slightly in advance of the end of the bag-blank. The forward movement of the bag-blank pushes the end thereof under the gripper J while the same is still elevated, after which the gripper is swung down, so as to grip the end of the blank upon the folding-bed. The parts of the gripper in this initial gripping position are shown in Fig. 11. As the rotary bed advances the bag-blank is drawn forwardly with it, and the creasing-blade 37 swings down and approaches the periphery of the rotary cylinder so that it meets the elastic surface $h'$ of the bed and by meeting such surface forms the primary crease. The side grippers K have approached the point where the creasing-blade meets the folding-bed in an open condition, with the result that when they are swung in toward the folding-bed they come over or above the edges of the bag-blank. The creasing-blade in swinging down to meet the folding-bed strikes both of these grippers and pushes them down against the folding-bed, whence they grip and clamp the blank upon the same. These side grippers are locked in an inward and downward position by the pins 38', Fig. 23. The point of engagement of the side grippers K is immediately in the rear of the primary crease-line, and their cutaway tops permit the creasing-blade to crease the blank in the proper place. As the folding-bed advances the side pinching-fingers N move in and grip the lower ply of the blank to the folding-bed, and the pinching-fingers L and M also move in and engage the upper ply of the blank, Fig. 13. The continued forward movement of the bed causes the fingers M and L to swing upwardly and backwardly, thereby folding the upper ply about the side grippers K K, while at the same time the lower ply is held to the bed. When the pinching-fingers L and M are in such position that the side edges of the bag-blank are in a standing position, Fig. 14, these edges strike against the stationary edge-turners T T, which bend in or turn in the standing edges of the blank and cause them to both move inwardly, so that the continued backward motion of the pinching-fingers L M brings these standing sides downwardly and into a flat condition, so as to complete the diamond fold. The bag-blank folded in this way is shown in Figs. 15, 16, and 17, although in Fig. 17 the paste is also shown applied to the edge of the diamond fold. This is done by the usual pasting-rolls, after which the prow portion of the diamond fold is turned back and rolled and pasted, as shown in Fig. 18, and then the diamond is again folded back to form the blind fold, as shown in Fig. 19, by which act the remaining portion of the diamond fold is brought back so that it is pasted to complete the bag-bottom. The finished bag is then discharged from the machine.

It will be understood that changes and variations from the mechanism herein shown and described can be made without departing from the spirit of our invention as defined by claims.

What we claim as our invention is—

1. The combination with the folding-bed and means for gripping the blank thereupon, of a blank-guide located over and close to the folding-bed and arranged to hold the bag against the bed until it is engaged by the gripping device.

2. The combination with the folding-bed and with means thereon for gripping the lower ply of the front end of the bag-blank, of a tongue having its end positioned over and close to the folding-bed, the said tongue being adapted to guide the bag-blank to the gripping device of the folding-bed and having an aperture through which the gripper passes.

3. The combination with a rotary blank-carrier providing a folding-bed, of a gripping device arranged thereupon and rotated thereby, and a tongue adapted for arrangment within the bag-blank and having its end located over the folding-bed and the end of the tongue being bifurcated at the point where the gripper engages the blank, the gripper being arranged to pass through the bifurcation in the tongue, substantially as described.

4. The combination with the rotary cylinder providing a folding-bed, of a former supported by the machine-frame and adapted as a guide for the bag-blank, a tongue secured to the end of the former and having its forward end bifurcated and arranged in position over the rotary cylinder, and a gripping device on the cylinder adapted to grip the blank as the same is advanced over the end of the tongue, the gripper being arranged to pass through the bifurcation in the tongue, substantially as described.

5. The combination of a slotted guide for the tucked tube, and a cutting device having cutting portions located on opposite sides of the tube-guide, and also having a cutting portion adapted to pass through the slotted part thereof, substantially as described.

6. The combination with a former for the bag material, of a tongue secured to the end of the former and having a slotted portion between its ends, a rotary cylinder providing a folding-bed located at the other end of the tongue, and cutting mechanism comprising a cutting-blade adapted to cut the material on opposite sides of the tongue, and provided with teeth adapted to pass through the slots in the tongue, substantially as described.

7. In a bag-machine, the combination with the folding-bed, of a blank-engaging device thereon, and a tongue for guiding the blank to the folding-bed, said tongue having a recessed or bifurcated end, and the said device being arranged to pass through said recess or bifurcation, substantially as described.

8. The combination with a tongue for the bag material, said tongue being apertured between its ends, of a single cutting device having a cutting section adapted to pass through the apertured portion of the tongue and made as wide as the material, whereby the bag-blank material is cut throughout substantially the entire width thereof, substantially as described.

9. The combination with the folding-bed, of a front gripper having rearwardly-diverging beveled side edges, side grippers, and means for causing the side grippers to grip the sides of the bag-blank.

10. The combination with the folding-bed, of a front gripper having rearwardly-diverging beveled side edges, tuck-grippers, and means for causing said tuck-grippers to grip the lower ply of the bag-blank.

11. The combination with the folding-bed, of a front gripper having rearwardly-diverging inclined or beveled side edges, and devices for engaging the upper ply of the bag-blank and folding the same backwardly.

12. The combination with the tongue for the bag material, the said tongue having a cut-away portion between its ends, of cutting mechanism for cutting the bag material as the same passes along the tongue, said cutting mechanism comprising a cutting-blade having teeth for cutting the material on opposite sides of the tongue, and also having teeth adapted to pass into the cut-away portion of the tongue.

13. The combination with the tongue for the bag material, the said tongue having a cut-away portion between its ends, of cutting mechanism for cutting the bag material as the same passes along the tongue, said cutting mechanism comprising a cutting-blade having teeth for cutting the material on opposite sides of the tongue, and also having teeth adapted to pass into the cut-away portion of the tongue, a blade adapted to coöperate with said cutting-blade, and means for rotating said blades so as to cause the coöperating blade to immediately follow the cutting-blade.

14. The combination with the former, of a tongue extending forwardly therefrom, the said tongue being composed of a metallic strip provided with slots between its ends, a rotary cylinder providing a folding-bed arranged below the forward end of the tongue, a gripping device carried by the cylinder, cutting mechanism for cutting the bag material as the same passes along the tongue, the said mechanism comprising a roll carrying a cutting-blade having teeth adapted to cut the material on opposite sides of the tongue, and also having teeth adapted to extend through the slots of the tongue, a rotary blade adapted to coöperate with the cutting-blade, and means for rotating said roll and coöperating blade so as to cause the coöperating blade to immediately follow the cutting-blade, substantially as described.

15. A front gripper having forwardly-converging sides, substantially as described.

16. The combination with the folding-bed, of side grippers having their forward edges inclined rearwardly, a creasing-blade extending across the full width of the blank between the side grippers and means for operating the creasing-blade.

17. The combination with the folding-bed, of side grippers therefor having cut-away portions, a creasing-blade adapted to fit into the cut-away portions of the side grippers and extending across the full width of the bag-blank between the side grippers, and means for operating said grippers and creasing-blade, substantially as described 18. The combination with the folding-bed, of side grippers therefor, a creasing-blade extending between the grippers, and provided with an extension adapted to strike the grippers and depress the same and means for operating the creasing-blade, substantially as described.

19. The combination with the folding-bed, of vertically-adjustable side grippers, longitudinally-arranged spindles carrying said grippers, said spindles being pivotally connected with the folding-bed, spring means tending to swing the spindles so as to raise the grippers, and means for depressing the grippers, substantially as described.

20. The combination with the folding-bed, of vertically-adjustable side grippers therefor, spindles carrying said grippers, the grippers being pivotally mounted upon said spindles and the spindles being pivotally connected to the folding-bed, springs tending to swing said spindles so as to lift the grippers, a creasing-blade extending between the grippers and having an extension adapted to strike against and depress the grippers, means for operating the creasing-blade and means for locking the grippers in their depressed position.

21. The combination with the folding-bed, of side grippers therefor, means for carrying said grippers and permitting the vertical adjustment of the same, spring means tending to elevate the grippers, means for depressing the same, and pins for locking the grippers in their lowermost positions.

22. The combination with the folding-bed, and means for holding the lower ply of the bag-blank thereon, of a pair of pinching-fingers, means for supporting the same, spring means tending to hold the fingers together, means for rocking the fingers in unison, and a catch adapted to hold the rear or under finger temporarily against rocking whereby the fingers will be opened to permit the entry of the bag-blank.

23. The combination with the folding-bed, of means for holding the lower ply of the bag-blank thereon, pinching-fingers, a rock-shaft on which the fingers are mounted the advance or upper finger being fixed to the shaft and the lower or rear being loose thereon, a spring tending to hold the fingers together, a catch adapted to engage a projection on the loose finger, means for rocking the shaft carrying the fingers, and means for tripping the catch after the shaft has begun to rock, substantially as described.

24. The combination with the folding-bed, of means for holding the lower ply of the bag-blank thereon, a pair of pinching-fingers, a rock-shaft carrying the same, one of the fingers being fixed on the shaft and the other loose thereon, a spring tending to hold the fingers together, means for rocking the shaft so as to swing the fingers, said means comprising a rock-shaft geared to the pinching-finger shaft, a roller carried by the rock-shaft, and a cam adapted to swing the rock-shaft so as to cause the rocking of the pinching-finger shaft, a catch adapted to engage the loose finger when the fingers are in their forward position, a roll adapted to trip said catch shortly after the finger-shaft has begun to rock, an abutment for stopping the loose finger shortly before the shaft carrying the fingers reaches the end of its movement, whereby the fingers are separated or opened, and a spring tending to rock the finger-shaft in a reverse direction, substantially as described.

25. The combination with the folding-bed and means for holding the lower ply of the bag-blank thereon, of pinching-fingers, a rock-shaft carrying the same, the upper or forward finger being fixed upon the shaft and the lower or rear one loose thereon means for rocking said shaft, a spring tending to hold said fingers together, a catch arranged to engage the loose finger when the fingers are in their forward position, means for tripping the said catch shortly after the shaft has begun to rock, and an abutment for stopping the rocking of the loose finger shortly before the rocking of the shaft ceases.

26. The combination with the folding-bed and means for holding the lower ply of the bag-blank thereon, of pinching-fingers, a shaft carrying the same, the upper or forward finger being fixed upon the shaft and the lower or rear one loose thereon, a spring tending to hold said fingers together, a catch arranged to engage the loose finger when the fingers are in their forward position, means for tripping said catch shortly after the shaft has begun to rock, an abutment for stopping the rocking of the loose finger, and means for rocking the shaft carrying the pinching-fingers.

27. The combination with the rotary cylinder providing the folding-bed, of devices for engaging and turning the upper tuck of the bag-blank, a curved arm extending forwardly from the tuck-turning devices and carrying such devices at its rear end and pivotally connected to the folding-bed at its forward end, the axis of pivotal connection being a radius of the cylinder, and means for swinging said arm so as to move the tuck-turning devices toward and away from the cylinder as required, substantially as described.

28. The combination with a rotary cylinder providing a folding-bed, and with a roll U coöperating with the cylinder, of a roll 70 arranged close to the cylinder and having its outer periphery substantially in line with a tangent between the cylinder and the roll U so that the bag-blank as it leaves the cylinder will pass outside of the roll 70, a tucking-blade 72 arranged to strike the bag-blank between rolls U and 70 and thereby force it between the roll 70 and the cylinder in a doubled-back condition, and means for actuating the blade 72, as set forth.

29. The combination with a rotary cylinder providing a folding-bed, of a swinging arm pivotally connected to said cylinder and having its free end extending rearwardly from its point of connection, a rocking block pivotally connected with the rear end of said swinging arm, devices for engaging the upper ply of the bag-blank and turning the same back, means for engaging the lower ply and holding the same upon the folding-bed, said devices being mounted upon the rocking block, means for swinging the arm so as to move the rocking block in and out toward and away from the bag-blank as required, means for tilting the rocking block during its forward movement so as to move the lower tuck-gripping device toward and away from the folding-bed as required, and means for operating the upper tuck-turning mechanism as required during the forward motion of the rocking block, substantially as described.

30. The combination with a rotary cylinder providing a folding-bed, of an arm pivotally connected with the cylinder and extended rearwardly from its point of pivotal connection, a rocking block pivotally connected with the free end of said arm, a lower tuck-gripper secured to said rocking block, upper tuck-pincers, a rock-shaft carrying said pincers and mounted upon said rocking block, the outer finger being fast on the shaft and the inner one being loose thereon, spring means for holding the fingers together, a catch for engaging the loose finger when the fingers are in their foremost position, means for actuating said catch shortly after said shaft begins to turn, an abutment for stopping the loose finger shortly before the shaft completes its rocking movement, a rocker-arm geared to said shaft, a cam for swinging said rocker-arm as required to rock said shaft, means for swinging the arm pivotally connected with the cylinder in and out toward and away from the cylinder as required during the advancement of the folding-bed, and a cam for tilting the rocking block so as to move the lower tuck-gripper toward and away from the folding-bed as required during such advancement of the bed, substantially as described.

31. The combination with a movable folding-bed and means for holding the lower ply of the bag-blank thereon, of means for swinging the upper ply of the bag-blank backwardly so as to form the diamond fold, and stationary edge-turners arranged on opposite sides of the folding-bed and comprising inclined abutments located so as to be struck by the edges of the blank when the same are in a standing position.

32. The combination with a movable folding-bed, of means for forming the diamond fold thereon, and stationary edge-turners arranged on opposite sides of the folding-bed, said edge-turners comprising blades sloping outwardly in a sidewise and downward direction from their rearward ends and located so as to act upon the edges of the bag-blank when the same are in a standing position.

33. In a bag-machine, stationary side edge-turners consisting of stationary abutments inclined inwardly into the path of travel of the bag-blank, and located so as to act while the edges of the bag-blank are in a standing position, substantially as described.

34. In a bag-machine, stationary edge-turners comprising blades sloping outwardly in a forward and downward direction from their rearward ends and situated above the folding-bed to such an extent as to strike the edges of the bag-blank when the same are in a standing position.

35. The combination with the folding-bed, of edge-turning devices, a front gripper having rearwardly-diverging side edges and means for turning the upper ply of the bag-blank backwardly.

36. The combination with a rotary cylinder providing a folding-bed, and the roll U of a tucking-roll 70, arranged with its outer periphery substantially in line with a tangent passing between the cylinder and roll U, an arm 71 carrying a tucking-blade 72, a link 73 connected with the arm 71, a shaft 75 carrying rocker-arms 74 and 76, and a rotary shaft carrying a rotating cam 77 adapted to actuate the rocker-arm 76, substantially as described.

37. The combination with a rotary cylinder providing a folding-bed, of a pair of tucking-rolls 80 and 81 arranged adjacent to the cylinder, gearing between said rolls and the cylinder for rotating both of the rolls as desired, a tucking-blade 83 arranged to direct the bag-blank between the rolls 80 and 81 and mechanism for actuating the blade 83, substantially as described.

38. The combination with a rotary cylinder, of a shaft for supporting the same, a set of cams secured together so as to move in unison and mounted upon the said shaft, devices coöperating with said cylinder and actuated by the cams, and means for moving the cams bodily along the shaft, substantially as described.

39. The combination with the rotary cylinder providing the folding-bed, of a shaft therefor, a set of cams secured together and mounted upon said shaft, devices coöperating with the cylinder and actuated by the cams, and means for swinging or adjusting the cams about the shaft, substantially as described.

40. The combination with the rotary cylinder, of the shaft, devices coöperating with the cylinder and actuated by the cams therefor, cams secured together mounted upon the shaft, a collar also mounted upon the shaft and provided with arms or rods engaging the cams, and a lever for rotating said collar.

41. The combination with a front gripping device having rearwardly-diverging side edges, of side grippers adapted to clasp both plies of the bag-blank and hold the same against the folding-bed, lower tuck-gripping devices, and means for engaging the upper ply of the bag-blank and folding the same backwardly.

42. In a bag-machine, a side gripping device having its forward edge inclined rearwardly.

43. In a bag-machine, a side gripping device cut away in the rear of its point of engagement.

44. In a bag-machine, a side gripping device adapted to engage the bag-blank at the edge of the folding-bed and cut away in the rear of its point of engagement.

45. The combination with the folding-bed of a side gripping device cut away inside of its point of engagement of the blank, a creasing device extending to the cut-away edge of the gripping device, and means for operating the creasing-blade.

46. In a bag-machine, a front gripper provided with an inwardly and forwardly inclined side edge, substantially as described.

47. In a bag-machine, a front gripper provided with inwardly and forwardly inclined side edges, substantially as described.

48. The combination with a guide for the tucked tube, having a slotted portion, of cutting-blades located opposite the slotted portion of the guide, and extended beyond the sides of the guide, said cutting-blades being located side by side, and means for actuating said blades so as to cause their simultaneous cutting action.

49. The combination with a tongue having a slotted portion, of a cutting device having a portion arranged to pass through the slotted portion of the tongue, and also having portions located on opposite sides of the tongue.

50. The combination of a tongue having a slotted portion, of cutting-blades located opposite the slotted portion of the tongue, and extended beyond the sides of the guide, and a single element carrying said cutting-blades, substantially as described.

51. The combination with a tongue having a slotted portion, and a cutting device consisting of a cutting-blade 15 mounted in a roll E having a cut-away portion 16 in front of the blade 15, the said blade 15 having teeth located at the sides of the tongue and also teeth located opposite the slotted portion of the tongue, and a rotary blade F arranged to cooperate with the cutting-blade 15, and located on the opposite side of the tongue.

In witness whereof we have hereunto subscribed our names this 10th day of October, A. D. 1901.

HERBERT E. WESTERVELT.
WALTER G. HOLMES.

Witnesses as to the signature of Herbert E. Westervelt:

HARRY G. SCHOCK,
EDA E. ROSENCRANS,

Witnesses as to the signature of Walter G. Holmes:

ANDREW ANDERSON,
ANDREW J. WARD.